July 1, 1930.  G. E. BULL  1,769,330
BALE TIE MACHINE
Filed March 23, 1929  7 Sheets-Sheet 5

INVENTOR
George E. Bull,
By Archworth Martin
Attorney.

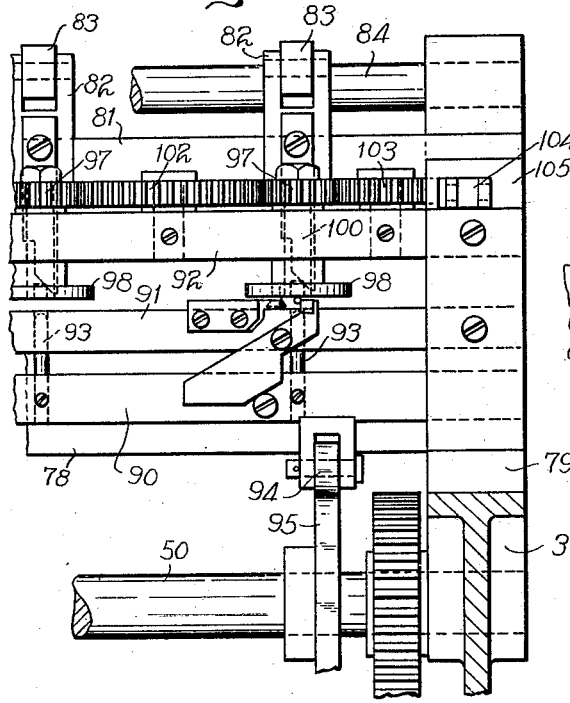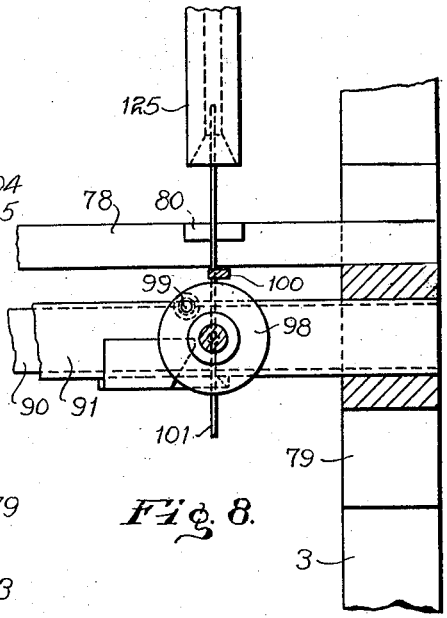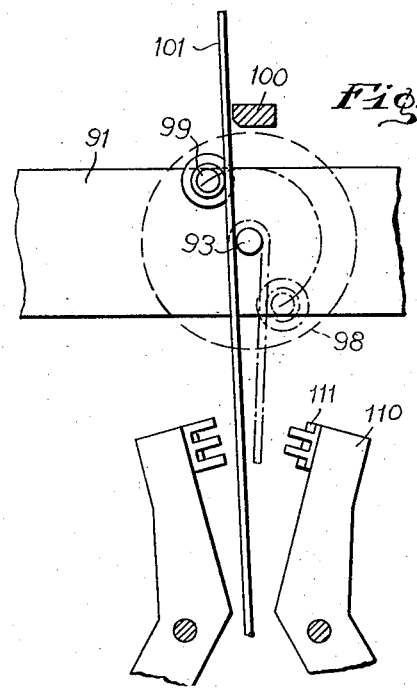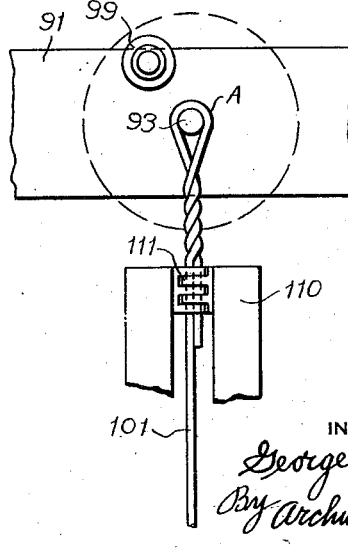

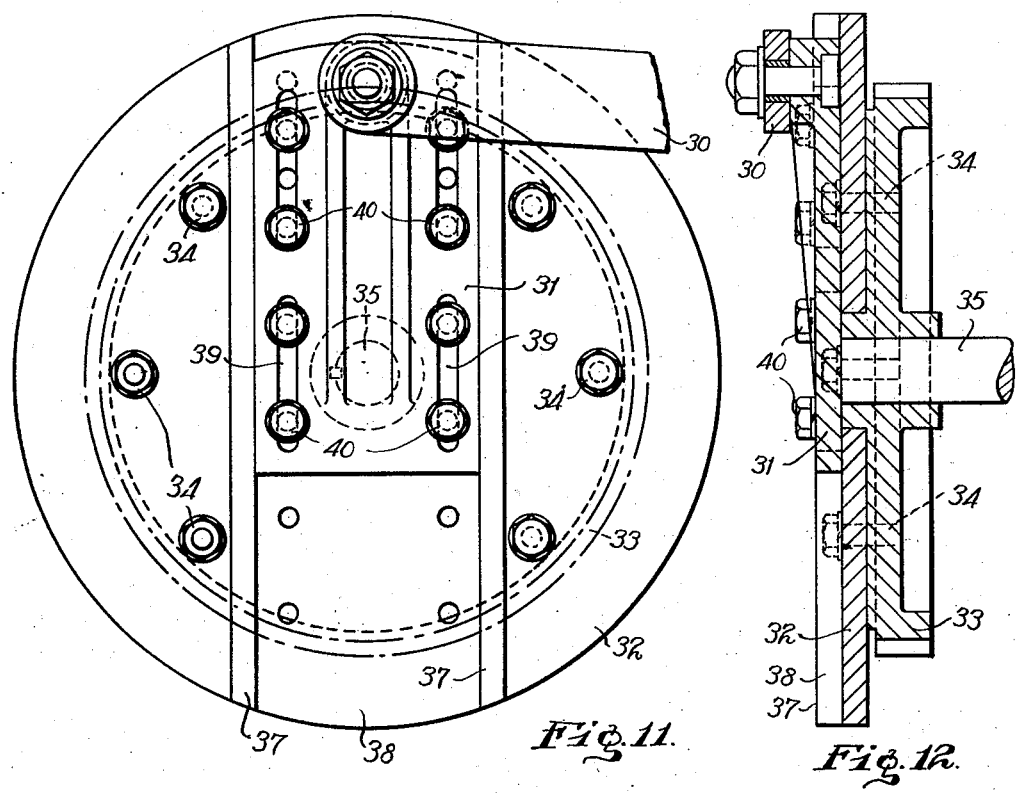
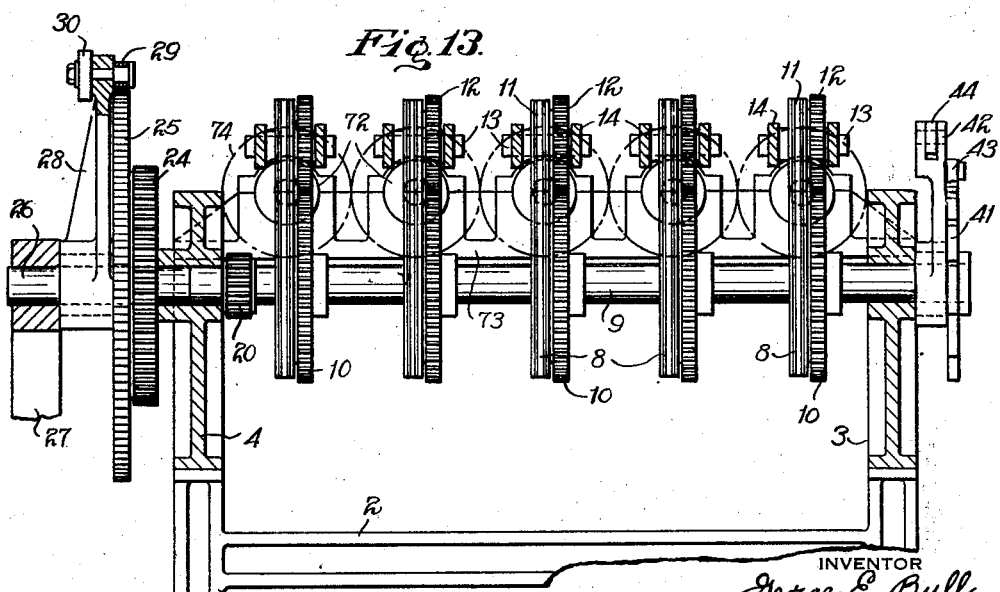

Patented July 1, 1930

1,769,330

UNITED STATES PATENT OFFICE

GEORGE E. BULL, OF BELLE VERNON, PENNSYLVANIA, ASSIGNOR TO PITTSBURGH STEEL COMPANY, OF PITTSBURGH, PENNSYLVANIA, A CORPORATION OF PENNSYLVANIA

BALE-TIE MACHINE

Application filed March 23, 1929. Serial No. 349,416.

My invention relates to bale-tie machines for forming bale-ties consisting of strands of wire having loops at one end thereof, although it is susceptible of use in various other arts.

One of the objects of my invention is to form a loop in the end of a wire and then advance the wire to be cut off in suitable predetermined lengths.

Another object of my invention is to provide improved mechanism for advancing the bale-tie wire to be cut off in lengths and which may be readily and easily adjusted to vary the length of the bale-ties.

Another object of my invention is to provide improved mechanism for forming the loop in the end of the bale-tie wire.

Still another object of my invention is to provide improved gripper and twister mechanism wherein the gripper mechanism may be readily adjusted to control the gripping action, on various gauges of wire to avoid weakening the bale-tie.

A further object is to provide simplified releasing and counting mechanism, the releasing mechanism serving to guide the completed bale-tie.

A still further object is to simplify and improve generally bale-tie machines, including machines wherein a plurality of bale-ties may be formed simultaneously.

These and other objects of the invention will appear in the description hereinafter set forth, taken in conjunction with the drawings.

Figure 1:
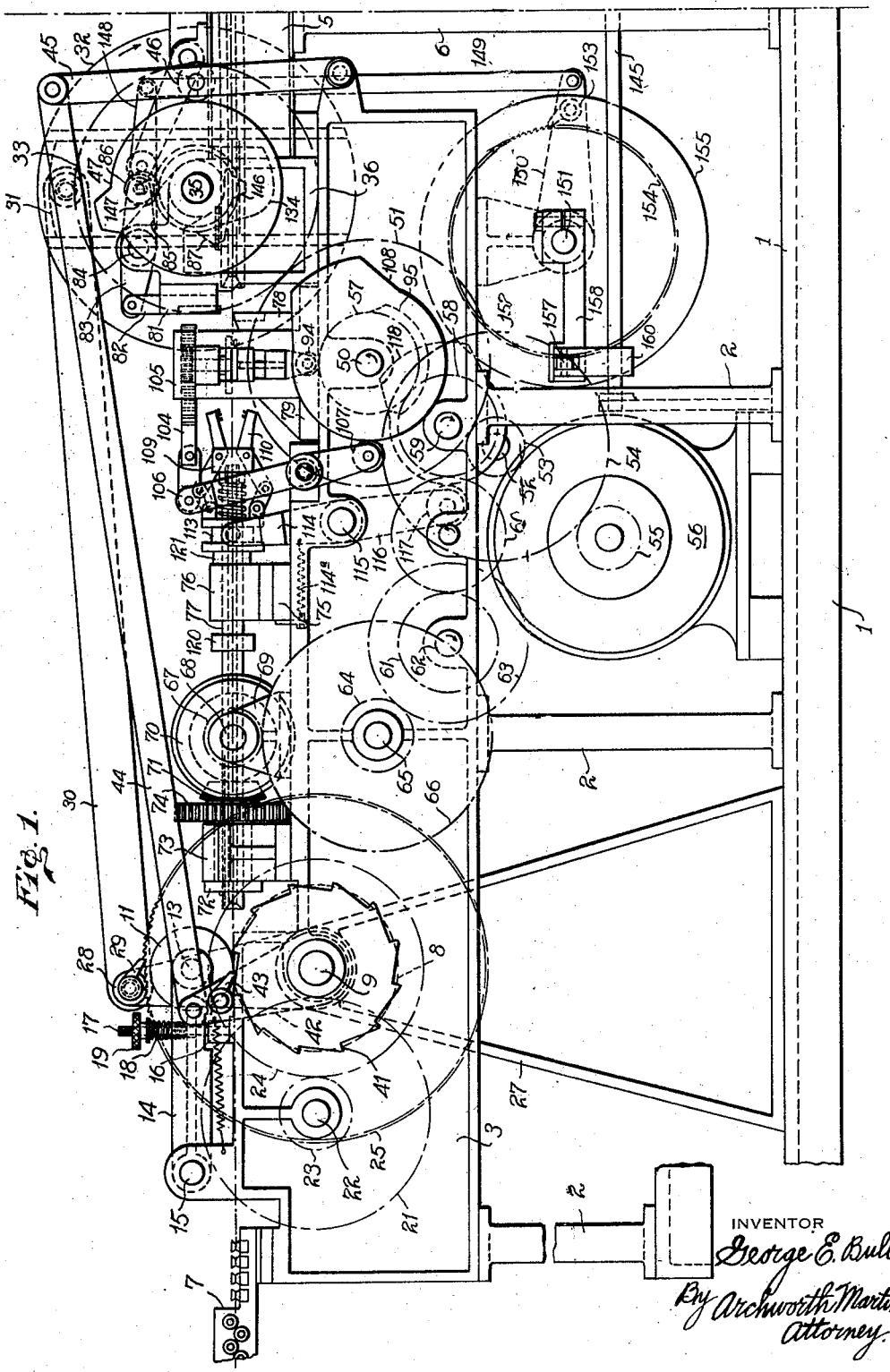
Figure 2:
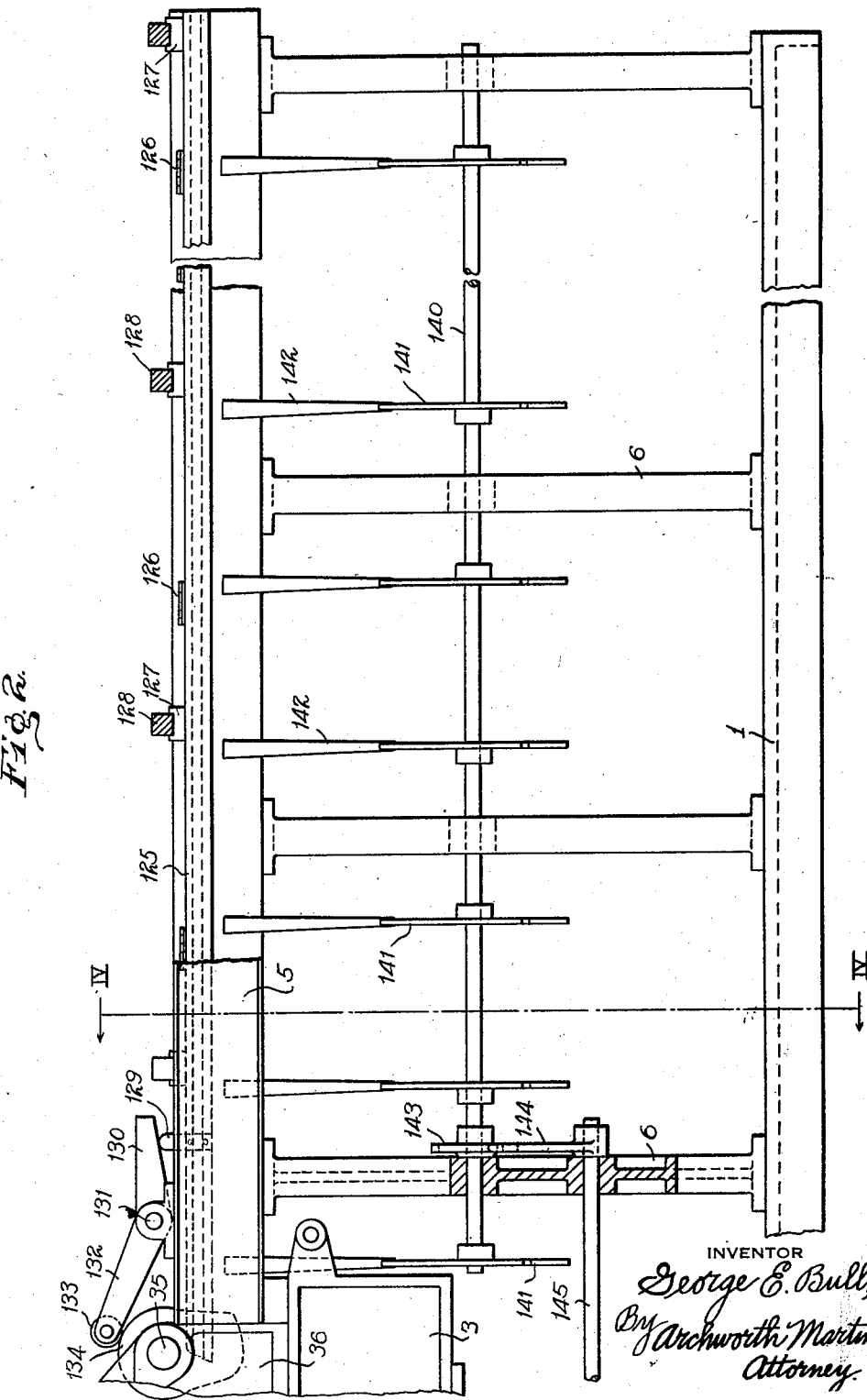
Figure 3:
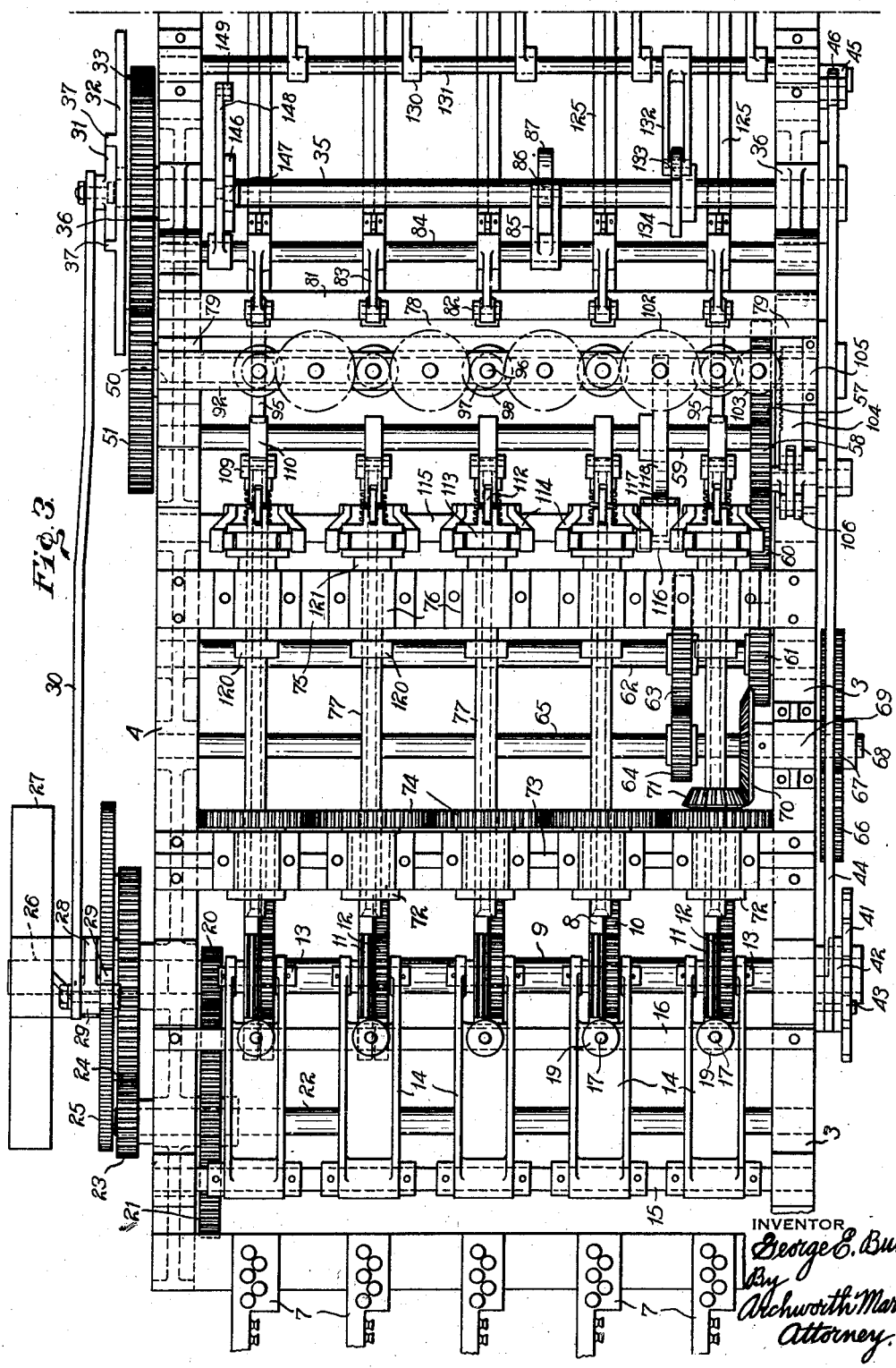
Figure 4:
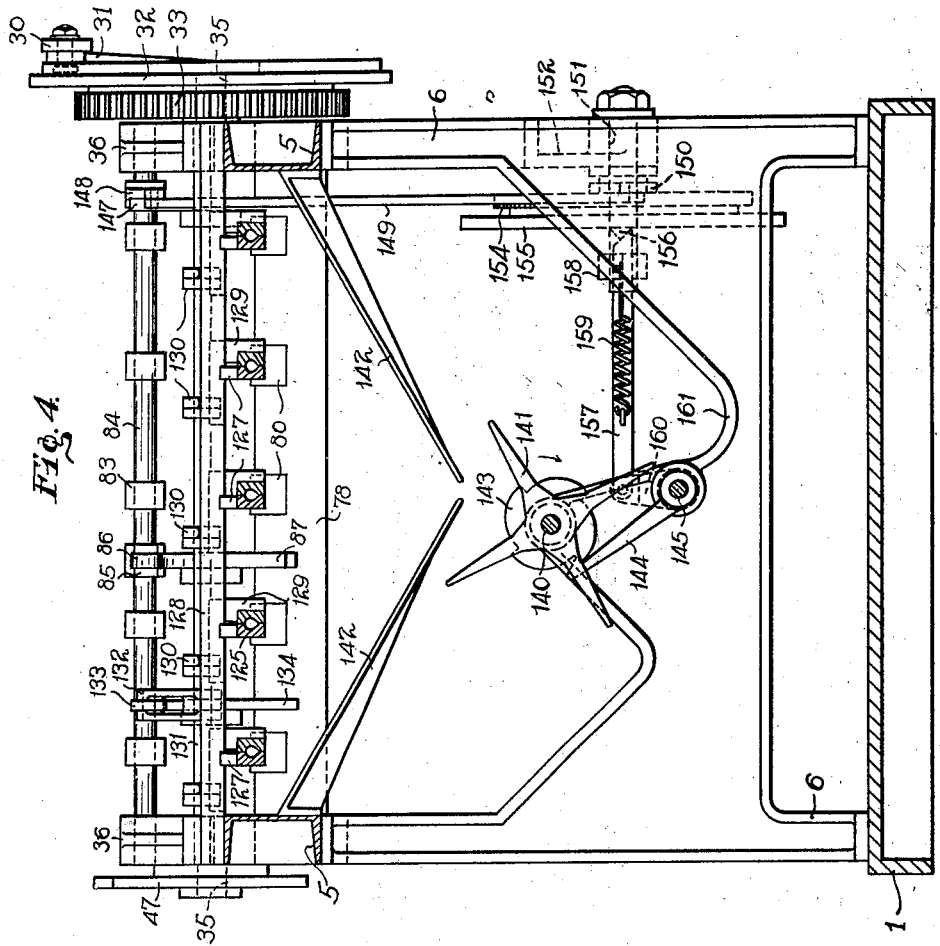
Figure 5:
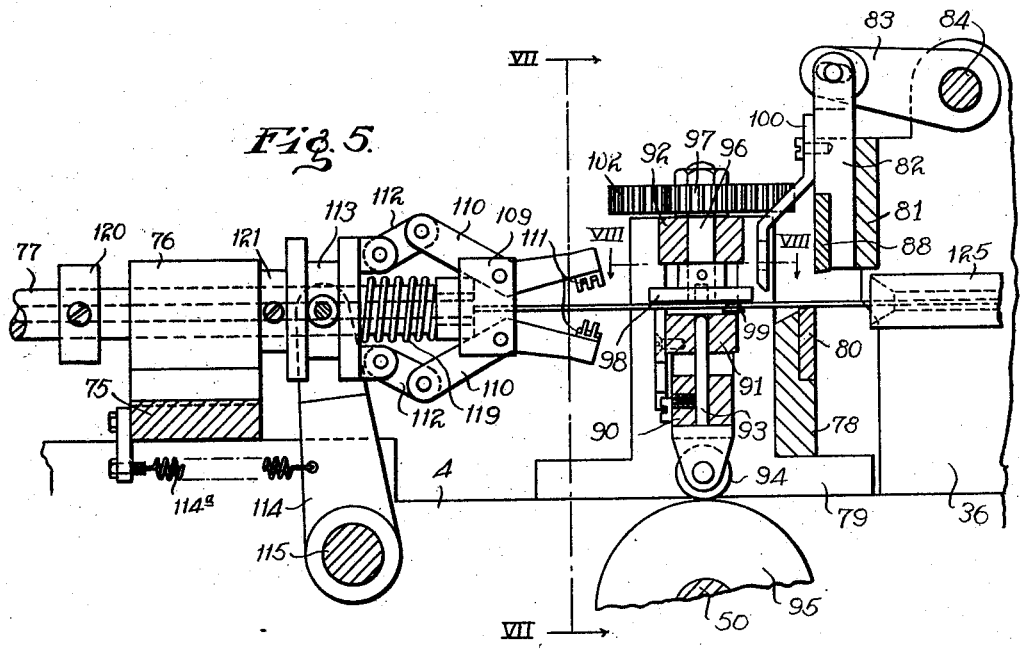
Figure 6:
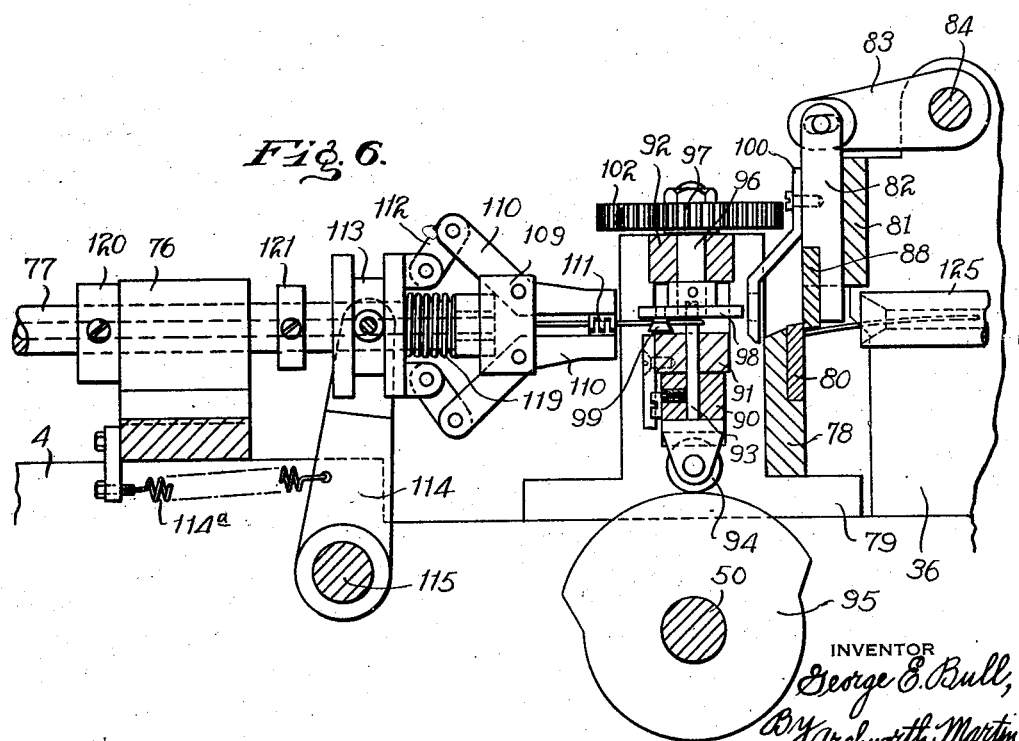

Referring to the drawings, Figures 1 and 2 when placed end to end show in side elevation the complete machine, Fig. 1 illustrating the bale-tie forming mechanism, and Fig. 2 illustrating the bale-tie releasing mechanism, various parts being broken away; Fig. 3 is a plan view of the bale-tie forming mechanism shown in Fig. 1; Fig. 4 is a transverse sectional view taken along the line IV—IV of Fig. 2; Fig. 5 is an enlarged detail view, partly in section, of the looping and twisting mechanism; Fig. 6 is a view similar to Fig. 5, with the parts shown in operating position; Fig. 7 is a fragmentary end view taken along the line VII—VII of Fig. 5, showing the looping mechanism; Fig. 8 is a horizontal section taken along line VIII—VIII of Fig. 5; Figs. 9 and 10 are fragmentary plan views showing the looping and twisting operations; Fig. 11 is an enlarged side elevational view of the adjustable feed-actuating mechanism; Fig. 12 is a vertical sectional view of the same; Fig. 13 is a transverse elevational sectional view of the wire feed mechanism, and Fig. 14 is a transverse sectional view, on an enlarged scale, of the bale-tie release guide.

Referring to the drawings, a suitable framework for supporting the parts of the machine comprises a base 1 having vertical stands 2 secured thereto, to which side frame members 3 and 4 are secured parallel with each other at each side of the stands. Channel beams 5 are secured to the rear ends of the side frames and aligned therewith, and are supported by the stands 6 and secured to the base 1.

Wire straighteners of any suitable construction are secured to the forward end of the frame to straighten the wires used to form bale-ties.

As is shown in Fig. 3 of the drawings, the mechanism for forming the bale-ties is disposed between the parallel side frame members and includes a drive, a feed device, a wire cutter, a bending device, a gripper and twister mechanism, a guide for the completed bale-tie, and the before-mentioned wire straightener. Each of the enumerated devices are disposed in longitudinal alignment, so that the bale-tie wire has an unobstructed straight path of travel through the machine. Owing to the improved and simplified construction of the various devices, a plurality of duplicate mechanisms may be disposed adjacent to each other to form a plurality of bale-ties in a single operation, without unduly increasing the over-all width of the machine, thereby increasing the output of the machine, with a consequent saving in time and factory space.

At the rear end of the bale-tie forming mechanisms, as shown in Figs. 1 and 3, I have provided an improved wire feed and length control device which may be readily and easily adjusted to vary the length of the bale-ties. This device and the drive serve to oper-

Adjustable wire feed mechanism

Feed-rollers 8 are mounted on a shaft 9 which is suitably mounted in bearings in the side frames 3 and 4, Fig. 1, 3 and 13. Adjacent to each feed-roller 8 is a gear wheel 10 which is secured to the shaft 9. Above each of the feed rollers 8 are located a feed roller 11 and a gear 12 mounted on a pin 13 which is supported in the outer end of an arm 14. A shaft 15 is mounted in suitable bearings on the side frames 3 and 4 and pivotally supports the arm 14. The gear wheels 10 mesh with the gear wheels 12, so that the feed rollers 8 and 11 move together to advance the wires when the shaft 9 is rotated.

A transversely-extending bar 16 is disposed beneath the arms 14 and is secured to the side frames. A web on the arm 14 is provided with slots through which pins 17 pass and are threaded into the bar 16. A spring 18 surrounds each pin 17 and bears on one of the arms 14, and a thumb nut 19 serves to regulate the tension of the spring, in order that the pressures on the wires between the feeder rollers may be adjusted to prevent slippage of the wire during the feeding movement.

The shaft 9 carries a pinion gear 20 that meshes with a gear wheel 21 which is secured to a shaft 22 journaled in the side frames 3 and 4. One end of the shaft extends through the frame 4 and carries a pinion gear 23 that meshes with a gear wheel 24. The gear 24 is securely mounted on a hub of a ratchet wheel 25 (Figs. 3 and 13) which is loosely mounted on a jack-shaft 26. The jack shaft 26 is mounted in the side frame 4 with one end abutting the shaft 9 and the other end is journaled in an upright 27. A ratchet arm 28 is loosely mounted on a hub of the ratchet wheel 25 and carries a pawl 29 for engaging the ratchet teeth.

One end of a connecting rod 30 (Figs. 1, 3 and 13) is secured to the ratchet arm 29 and its other end is secured to an adjustable crank arm 31 which is secured to a crank arm plate 32 (see Figs. 11, 12 and 13). The plate 32 is mounted on a hub of a gear wheel 33 and is secured thereby by means of the bolts 34. The gear 33 is mounted on one end of a shaft 35 which is journaled in bearing brackets 36 secured on the side frames 3 and 4.

The crank arm plate 32 is provided with elongated parallel projections 37 which form a diametrical channel 38 in which the crank arm 31 is adjustably positioned. The crank arm 31 is provided with a plurality of elongated slots 39 through which securing bolts 40 extend into certain of spaced-apart tapped holes in the bottom of the channel 38.

Due to this construction, it will be apparent that the crank arm "throw" may be readily and easily adjusted by the positioning of the crank arm 31, the length of the "throw" being determined by the radial position of the crank pin.

Rotative movement of the crank arm 31 imparts an oscillatory movement, through the connecting rod 30, to the ratchet arm 28 and causes the pawl 29 to include a predetermined number of ratchet teeth for each oscillation, thereby causing the feed rolls 8 and 11 to advance a predetermined length of wire. For example, the degree of oscillation is determined by the crank pin "throw" and the gear ratio between the shafts 26 and 9 is such that for an oscillatory movement of the arm 28 to include one ratchet tooth, three inches of bale-tie wire is advanced by the feed rolls 8 and 11.

By positioning the crank arm 31 so that oscillatory movement of the ratchet arm 28 causes the pawl 29 to include seventeen teeth, the feed rolls advance sufficient wire to form a bale-tie four feet in length, with three inches of wire remaining to form the loop in the end thereof, the loop being formed as hereinafter described.

The shaft 9 extends through the side frame 3 and a ratchet wheel 41 is secured to its outer end. An arm 42 is loosely mounted on the shaft 9 and carries a pawl 43 for engaging the teeth of the ratchet wheel. A connecting rod 44 has one end secured to the ratchet arm 42, the other end being secured to a lever 45 which is pivotally secured to the end of the side frame 3. A roller 46, carried by the lever 45, engages a cam 47 which is mounted on the outer end of the shaft 35.

The cam 47 is positioned on the shaft 35 so that immediately after the completion of wire-advancing movement, heretofore described, it engages the roller 46 to oscillate the lever 45 which oscillates the arm 42. If the wire-feeding mechanism has advanced the wire accurately to the proper length, it will come to rest with the teeth of the ratchet wheel 41 disposed in a definite angular relation to the cam-operated pawl 43. The forward movement of the arm 42 carrying the pawl 43, therefore does not cause any further movement of the wire. However, should the wire feeding mechanism come to rest before the correct angular disposition between the pawl and ratchet wheel has been reached, the pawl on the forward movement of the arm 42, engages the tooth on the ratchet wheel and advances it into the correct angular position, thereby causing further operation of the feeding mechanism to advance the wire to the accurate length.

The ratchet wheel 41 is provided with a number of teeth, corresponding in ratio, to the number of teeth on the ratchet wheel 25 as the ratio between the shaft 9 and 26. Thus, the angular relation between the pawl 43 and the ratchet teeth of the ratchet wheel 42 remains constant for the predetermined lengths of bale-tie wires.

This is an important feature of my invention, as I am able thereby to form bale-ties of a predetermined length with accuracy in the length of each bale-tie.

The driving mechanism

A drive shaft 50 is journaled in suitable bearings in the side frames 3 and 4, and a ring gear 51 is secured to the outer end of the shaft adjacent to the frame 4. A jackshaft 52 is journaled in a suitable bearing depending from the frame 4 and carries a pinion 53 and a ring gear 54, the pinion 53 meshes with and drives the gear 51 and the ring gear 54 meshes with a pinion 55 which is secured to the shaft of a motor 56. The ring gear 51 meshes with the gear 33 of the crank arm plate 32 to operate the wire feed mechanism as heretofore described.

The twister mechanism is driven from the shaft 50 by a gear train that includes a gear 57 carried by the shaft 50 and meshing with a gear 58 that is mounted on a shaft 59. An idler gear 60 meshes with the gear 58 and drives a gear 61 which is mounted on a shaft 62. A gear 63 carried by the shaft 62 meshes with a pinion gear 64 mounted on a shaft 65. A gear wheel 66 is secured to the outer end of the shaft 65 and meshes with a pinion gear 67 mounted on one end of a jack-shaft 68 which is journaled in a bearing block 69.

A bevel gear 70 is mounted on the other end of the jack-shaft 68 and drives a bevel gear 71 which is secured to the end of a guide sleeve 72 that is rotatably mounted in a bearing block 73 extending transversely between and secured to the frames 3 and 4. Similar guide sleeves 72 are equally spaced apart and supported in the bearing block 73 and each sleeve carries a gear wheel 74 that intermeshes with the adjacent gears. Thus, the bevel gears 70 and 71, through the gear train 74 drive each of the guide sleeves 72.

A transversely-extending bar 75 is secured to the frames 3 and 4 and carry equally-spaced apart bearing blocks 76 for slidably supporting one end of hollow twister-head shafts 77, the other end of the shafts being slidably secured in the sleeves 72, for a purpose to be hereinafter described.

Wire-cutting mechanism

The bale-tie wire is fed between cutter blocks that carry cutter plates for cutting the wire into lengths after the completion of the wire feed. Referring to Figs. 5, 6 and 7, a lower cutter bar 78 extends transversely between and is secured to the sides of brackets 79 that are secured on the side frames 3 and 4. Cutter plates or shear blades 80 are secured to the cutter bar 78, with the wire in position above the cutting edge of the plates.

An upper cutter bar 81 is secured to the sides of the bearing brackets 36, the face of the bar being slotted to receive and guide cutter blocks 82 which are slidably secured therein. The upper ends of the cutter blocks are bifurcated and have connection with the outer ends of arms 83 that are secured to a rock shaft 84 which is pivotally mounted in the bearing brackets 36.

The shaft 84 carries a rocker arm 85 that has a roller 86 secured to its outer end. The roller 86 co-operates with a cam 87 that is mounted on the shaft 35 to force the cutter blocks downwardly, thereby severing the bale-tie wires that are positioned between the cutter plates 80 and 88 (Figs. 3 and 6).

Wire bending or looping mechanism

The brackets 79 that are secured to the side frames 3 and 4 support a pin bar 90 (Figs. 5 and 6) a pin guide bar 91 and an upper bearing bar 92, all of which are vertically aligned above the shaft 50. The brackets 79 are provided with upwardly-extending arms between which and at the lower end whereof the pin bar 90 is slidably positioned. Equally-spaced apart loop-forming pins 93 are secured to the bar 90 and project upwardly through guide slots in the guide bar 91 which is secured to the brackets 79, to substantially the upper surface thereof. The pins 93 are adapted to be projected upwardly by vertical movement of the bar 90 to permit the bale-tie wires to be looped therearound.

Rollers 94 carried adjacent to each end of the bar 90 co-operate with cams 95 that are mounted on the drive shaft 50 to raise the pin bar 90 thereby projecting the pins 93 upwardly immediately following the cut-off operation.

Above each pin 93 and supported by the bearing bar 92 is a stud shaft 96 which carries at its upper end a pinion gear 97, and at its lower end a folding plate 98. The plate 98 is vertically spaced with respect to the upper surface of the guide bar 91 and the bale-tie wire passes therebetween. The plate 98 carries a downwardly projecting pin 99 which is so positioned that it lies to one side of the looping pin 93, and the bale-tie wire is brought into position with the pin 93 on one side and the pin 99 on the other side thereof, as shown in Figs. 8 and 9.

The wire normally lies above the loop-forming pin 93 (Fig. 8), and in order to position it so that it will assume the position as shown in Fig. 9, to lie between the pins 93 and 99, a camming bar 100 is provided and secured to the cutter block 82. Upon the downward stroke of the cutter block the lower end of the cam bar 100 engages the wire 101 and pushes it into the desired position, to one side of the pin 93 which is thereafter projected upwardly and into the folder plate 98.

An idler gear 102 is positioned between each of the pinion gears 97 and meshes therewith thus forming a gear train which is actuated to rotate the folder plate 98 thereby looping the wire 101 around the pin 93 into the position shown in broken lines in Fig. 9. In this position, the folded end of the wire is gripped by twister fingers and twisted in a manner hereinafter explained.

The end pinion gear 97 meshes with an idler gear 103 that co-operates with a rack 104 to actuate the gear train. The rack 104 is slidably mounted in a rack guide 105 that is secured to the bracket 79 (Figs. 1, 3 and 7).

The outer end of the rack 104 has link connection with the upper end of a rocker arm 106 which is pivotally mounted on the side frame 3. The lower end of the rocker arm 106 carries a roller 107 that has biased engagement with a cam 108 carried on the outer end of the drive shaft 50.

The outward thrust of the cam on the roller 107 causes the rocker arm 106 to slide the rack 104 inwardly and through the train of gears 97 and 102 oscillates the folder plate through a predetermined degree. The pinion gears 97 are adjustably secured to the shafts 96 in order that the folder plates 98 may be adjusted with their pins 99 in the desired position in relation with the degree of oscillation. In this manner it will be apparent that the degree of bend in the wire may be readily adjusted.

Gripper and twister mechanism

Mounted on the outer end of each of the twister shafts 77 is a twister head 109 which is provided with a pair of twister fingers 110 that carry co-operating grippers 111 at their outer ends (Figs. 1, 3 and 5). The twister fingers 110 are pivotally mounted on the twister head and are connected by the links 112 to a sleeve 113 which is slidably mounted on the twister shaft 77. A yoke lever 114 secured to the shaft 115 has suitable roller engagement with the sleeve 113. The shaft 115 is suitably journaled in the side frames 3 and 4 and carries a rocker arm 116 which is provided with a roller 117 which engages a cam 118 that is mounted on the shaft 59.

The shaft 115 is rocked by the co-engagement of the cam 118 and the roller 117 which causes the yoke lever 114 to slide the sleeve 113 forward. A spring 119 interposed between the sleeve 113 and the twister head 109 has sufficient pressure that the twister shaft 77 is caused to slide forwardly so that the ends of the twister fingers 110 are brought into position to overlie the folded end of the wire 101 as shown in Fig. 9. A stop collar 120 which is adjustably positioned on the shaft 77 behind the bearing block 76 arrests the forward movement of the shaft and twister head.

Due to the fact that the twister heads 109 are constantly rotating, the movement of the shaft 77 as described is necessary in order that the wire may be folded as hereinbefore described without being damaged by the rotating twisters which are only partially open.

Further forward movement of the sleeve 113 compresses the spring 119 and the toggle-links 112 cause the twister fingers 110 to bring the grippers 111 together into interlocking engagement with the folded end of the wire (Figs. 6 and 10). The wire 101 is twisted into the loop A while the twister fingers remain in engagement therewith, the fingers being immediately released from the wire as soon as a predetermined number of twists have been formed, as determined by the "timing" of the cam 118. Rearward movement of the sleeve 113, by reason of the tension of spring $114^a$ on the arm 114, opens the finger 110, until the sleeve engages a stop collar 121. Further rearward movement of the sleeve 113 slides the shaft 77 back into its normal position with the collar 121 abutting the bearing block 76.

The stop collar 121 is adjustably positioned on the shaft 77 and the width of the finger opening is determined by its position with respect to the head 109. The position of the stop collar 120 may be adjusted to vary the forward movement of the twister shaft, the movement of the sleeve 113 thereafter determining the pressure at which the twister fingers will engage the wire. It is obvious therefore, that for various gauges of wire the gripping pressure of the twister fingers may be readily adjusted by positioning the forward stop collar 120, to prevent an excessive pressure that would weaken the wire or sever it altogether.

Wire guide and counting mechanism

Upon the completion of the loop-forming operation, the cam 95 permits the pin bar 90 to drop, thereby retracting the pins 93 to disengage loops A. The feeding mechanism again operates to advance the wire. The loop at the head of each wire is projected into a wire guide 125 to prevent the wire from kinking or bending during the feeding movement. The wire guides are in longitudinal alignment with the twister shafts 77 and feeder rolls 8 and 11. Thus it will be seen that the wires are provided with unobstructed alined passages through the machine, the wires being suitably supported and guided at all times.

The wire is cut off at the completion of the wire feed, as previously described, the completed bale-ties thus formed resting in the wire guides 125.

Referring to Figs. 2, 4 and 14, the wire guides comprise pairs of longitudinally-extending grooved channels each pair being pivotally connected by hinges 126 which are secured to their upper edges. Spacer blocks 127 are secured to one of the wire guide channels and are secured to transversely-extending bars 128 that are supported by the channels 5. The other guide channel carries an arm 129 which is rocked by a rocker arm 130 and opens the wire guide 125. The rocker arm 130 is mounted on a shaft 131 which is mounted in suitable bearings supported on the channels 5. An arm 132 is secured to the shaft 131 and carries on its outer end a roller 133 which cooperates with a cam 134 that is mounted on the shaft 35 to rock the shaft 131, thereby causing the arms 130 to rock the arms 129 thus opening the wire guides 125 and releasing the bale-ties. The wire guides 125 then close to receive the succeeding bale-ties.

A bale-tie receiving mechanism is located beneath the wire guides 125 in position to receive the finished bale-ties, said mechanism retaining the bale ties until a predetermined number have been received and thereafter operating to discharge the ties onto a receiving stand where they may be bundled and removed by an operator.

A shaft 140 is rotatably supported in the transverse webs of the stands 6 and sets of radial arms 141 are located at intervals thereon. The finished bale-ties are released from the wire guides 125 and drop onto a series of inwardly and downwardly sloping arms 142 which are secured to the inner side of the channel beams 5. The bale-ties slide down the arms 142 and fall between two corresponding radial arms of each set 141 where they remain until a predetermined number have been received.

The shaft 140 and the sets of arms 141 are so disposed that the weight of the bundle of bale-ties tends to rotate the shaft 140. However, the shaft is provided with a retaining disc 143 which is suitably notched and co-operates with a latch 144 that is secured to a rock shaft 145, thereby preventing the rotation of the shaft 140. A counting device releases the latch 144 to permit the weight of bale-ties to rotate the shaft 140 and the finished bale-ties are discharged into receiving horns 161 which may be formed in the stands 6. The succeeding bale-ties are received by the sets of arms 141 while the discharged ties may be removed and bundled by an operator.

The counting device is operated by a cam 146 which is mounted on the shaft 35 and co-operates with a roller 147 which is carried by an arm 148. One end of the arm 148 is pivoted to the shaft 84 and its other end is connected to a rod 149 (Figs. 1 and 4). The rod 149 is connected to a rocker arm 150 which is pivotally mounted on a shaft 151 which is suitably supported in a bearing 152 secured to the side frame 4. The arm 150 carries a pawl 153 in position to engage a ratchet wheel 154 that is loosely mounted on the shaft 151. A cam wheel 155 is secured to the ratchet wheel 154 and is provided with a beveled lug 156 which is adapted to engage the beveled end of a push rod 157 once for every revolution of the ratchet wheel 154. The push rod 157 is slidably supported by a stationary bar 158 which is secured to the shaft 151. The rod 157 is biased in its inner position by a spring 159 and has pivotal connection with an arm 160 that is secured to the rock shaft 145.

When the lug 156 engages the push rod 157, the shaft 145 is rocked to move the latch 144 out of engagement with the retaining disc 143, to release the accumulated bale-ties as previously described. The lug 156 immediately passes out of engagement with the push rod 157 and permits the spring 159 to return the latch 144 into position to engage the succeeding notch in the retaining disc 143.

Briefly, the operation of my machine is as follows:—The wire to be formed into bale-ties is threaded through the wire straighteners 7, between the feed rolls 8 and 11, and into the hollow twister shafts 77. Power is applied to the machine and the adjustable crank arm 31 operates the feed rolls to advance the wires through the twister mechanisms between the cutter blocks and into the wire guides 125.

Upon completion of the wire feed, the cutter cam 87 operates the cutter block 82, which descends and severs the wires. As the cutter bar 82 descends, the cam bars 100 push the wire to one side, to lie between the pins 93 and 99 (Figs. 6 and 9). After the cutting stroke, the pin bar 90 is raised by the cam 95 and projects the loop-forming pins 93 upward into the ends of the shafts 96. Thereupon the cam 108 (Fig. 1) operates the rack 104 (Fig. 7) which rotates the discs 98 through the gears 97 and 102 and loops the end of the wires around the pins 93 (Fig. 8). The twister cam 118 now operates to slide the twister heads forward to overlie the ends of the wires, and then to close the grippers upon the wires. As each twister head is continuously rotating the wire gripped by each gripper is twisted to form the loop.

When sufficient twists have been formed in the wire the cam 118 releases the grippers and the twister heads return to normal position. The cam 95 permits the pin bar 90 to drop thus retracting the pins 93 from engagement with the loops thus formed.

Shortly after the completion of the wire feed, the guide release cam 134 operates to open the wire guides 125 and the bale-ties resting therein, drop onto the arms 142 and slide downward and accumulate between the radial arms 141 of the receiving mechanism (Fig. 2). The counting cam 146 then operates to advance the counting wheel 154.

As hereinbefore stated, I may readily form a plurality of bale-ties simultaneously. Thus, the counting wheel 154 counts in multiples such as 5, until, say 250 bale-ties are completed and discharged onto the receiving mechanism, thereupon the lug 156 (Fig. 4) cams the push rod 157 outward to rock the shaft 145 and releases the latch 144. The weight of the bale-ties rotate the shaft 140 and they are deposited onto the horns 161, to be gathered by an operator.

I claim as my invention:

1. In a bale-tie machine, the combination of a loop-form, means for folding the wire around said form, a rotary head, twister-fingers carried by said head, and means to advance the rotary head forwardly with the said fingers in open position and to close said fingers against the folded wire.

2. In a bale-tie machine, the combination of a loop-form, means for folding the wire around said form, a hollow rotating shaft, a twister head mounted on said shaft, twister fingers carried by said head, and means for sliding said shaft forwardly with the said fingers in open position and to close said fingers into gripping engagement with the folded wire.

3. In a bale-tie machine, the combination of a loop-form, means for folding the wire around said form, a twisting mechanism comprising a hollow rotating shaft, a twister head mounted on said shaft, a sleeve slidably mounted on the shaft, resilient means disposed between the said head and sleeve, twister fingers carried by the twister head and operatively connected to the said sleeve, and means engaging said sleeve to advance said mechanism forwardly with the fingers in open position and to further advance the sleeve to close the said fingers to grip the folded wire.

4. In a bale-tie machine, the combination with a wire bending mechanism, of a wire twisting mechanism comprising a hollow shaft, a rotatable head mounted on said shaft and having partially open gripper fingers, means for sliding said mechanism forward towards the wire bend, and means for closing said grippers into engagement with the wire.

5. In a bale-tie machine, the combination with a wire bending mechanism, of a wire twisting mechanism comprising a hollow shaft, a rotatable head mounted on said shaft, and having partially open gripper fingers, stop means for limiting forward movement of said shaft, a sleeve resiliently mounted on said shaft, and means engaging said sleeve to advance said mechanism against the stop and to further advance the sleeve to close the said fingers to engage the wire and form a loop.

6. In a bale-tie machine, the combination of a loop-form, means for folding the wire around said form, a wire twister mechanism, gripper fingers carried by said mechanism, means for advancing said mechanism forwardly with the said fingers in open position and to close said fingers to grip the folded wire, and means for controlling the gripping pressure of said fingers on the wire.

7. The combination with a wire twister and means for rotating the same, of a gripping device movable into position for holding the wire during a twisting operation, means for moving said gripping device into engagement with the wires and means actuated by said moving means for controlling the gripping pressure of said device upon the wire.

8. In a bale-tie machine, the combination with a bale-tie forming mechanism, of a wire feed mechanism therefor, a device for actuating said feed mechanism to advance a predetermined length of wire, and means effective upon failure of the said feed mechanism to sufficiently advance the wire for further actuating said feed mechanism to advance the wire the predetermined distance.

9. The combination with apparatus for operating upon wire, of mechanism for intermittently advancing the wire predetermined distances, and means effective upon failure of the mechanism to sufficiently advance the wire during a given operation, to further advance the wire until it has completed the said movement of predetermined distance.

10. The combination with apparatus for operating upon wire, of mechanism for intermittently advancing the wire predetermined distances, a ratchet wheel operatively associated with said mechanism, an oscillating arm having a pawl for engaging the said wheel, and means for oscillating said ratchet arm after the completion of the wire advancing movement, said pawl engaging said ratchet wheel to further actuate said mechanism to advance the wire the predetermined distance upon failure of the said mechanism to sufficiently advance the wire.

11. In a bale-tie machine, the combination with a bale-tie forming mechanism, of a wire guide for receiving and supporting the finished bale-tie comprising a pair of longitudinally extending grooved channels, means for pivotally connecting the channels to form a normally closed bore to receive the bale-ties, means carried by one channel for supporting the wire guide, and means operable to rotate the other channel to open the guide and discharge the completed bale-tie resting therein.

12. In a bale-tie machine, the combination with a bale-tie counting mechanism, of a plurality of normally closed wire guides, means operable to open the said guides, downwardly and inwardly sloping guide arms, a shaft having sets of radially-extending arms thereon and dispose in position beneath the said guide arms to receive the bale-ties discharged therefrom, the weight of the accumulating bale-ties tending to rotate said shaft, a latch for preventing rotation of said shaft, and means operative by said counting mechanism for releasing said latch to discharge the bale-ties.

13. In a bale-tie machine, the combination with a wire bending mechanism, of a continuously rotating twister mechanism normally positioned beyond the bending radius of the wire, gripper fingers carried thereby, and means for moving said twister mechanism forwardly to position the said fingers within the benidng radius of the wire and to close the fingers against the bent wire.

14. In a bale-tie machine, the combination with means for forming a bend in the end of the wire, of a continuously rotating twister mechanism, gripper fingers carried thereby, said mechanism normally positioned beyond the bending radius of the wire, means operable to move said mechanism into the bending radius of the wire, and means actuated by further movement of the said means to close the said fingers to grip the bent wire.

15. The combination with a wire bending mechanism, of a wire twister and gripper mechanism movable longitudinally of said bending mechanism, means for moving the second-named mechanism towards the first-named mechanism, and means actuated by further movement of said moving means for controlling the gripping pressure of the gripper mechanism upon the wire.

In testimony whereof I, the said GEORGE E. BULL, have hereunto set my hand.

GEORGE E. BULL.